United States Patent [19]

Maruko

[11] 4,317,444
[45] Mar. 2, 1982

[54] SOLAR HEAT UTILIZATION APPARATUS

[76] Inventor: Saburo Maruko, 430-3 Kamiwada, Yamato-Shi, Kanagawa-Ken, Japan

[21] Appl. No.: 119,882

[22] Filed: Feb. 8, 1980

[30] Foreign Application Priority Data

Feb. 27, 1979 [JP] Japan .................................. 54/21440

[51] Int. Cl.³ ............................................... F24J 3/02
[52] U.S. Cl. ..................................... 126/438; 126/417; 126/432; 126/442
[58] Field of Search ............... 126/438, 439, 432, 419, 126/422, 434, 424, 425, 442; 353/3; 350/289

[56] References Cited

U.S. PATENT DOCUMENTS

| | | | |
|---|---|---|---|
| 1,814,897 | 7/1931 | Coxe ...................................... | 126/438 |
| 2,688,922 | 9/1954 | Bonaventura et al. .............. | 126/438 |
| 4,052,976 | 10/1977 | Hinterberger ................... | 126/438 X |
| 4,083,490 | 4/1978 | Cunningham et al. .............. | 126/419 |
| 4,098,264 | 7/1978 | Brokaw ............................ | 126/438 X |
| 4,153,039 | 5/1979 | Carroll ............................. | 126/438 X |
| 4,227,513 | 10/1980 | Blake et al. ...................... | 126/438 X |
| 4,252,107 | 2/1981 | Horton ................................ | 126/438 |

*Primary Examiner*—Larry Jones
*Attorney, Agent, or Firm*—Pearne, Gordon, Sessions, McCoy & Granger

[57] ABSTRACT

A solar heat utilization apparatus adapted to focus received sunrays and utilize the focused sunrays as heat energy for heating and cooling purposes and comprising a sunray reflector having a paraboloid and including a vertical rotary shaft extending vertically in the center of the reflector, a plurality of horizontal rotary shafts positioned below the reflector for rotatably supporting the reflector, a heat collecting means provided on the reflector above the vertical rotary shaft and, a liquid recycle pipe provided along the heat collecting means.

8 Claims, 9 Drawing Figures

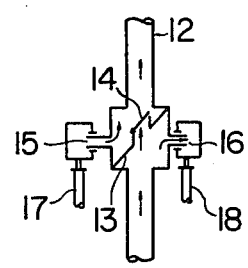
FIG. 7
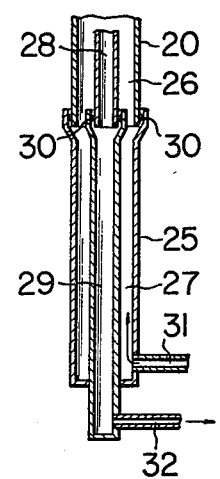
FIG. 8
FIG. 9
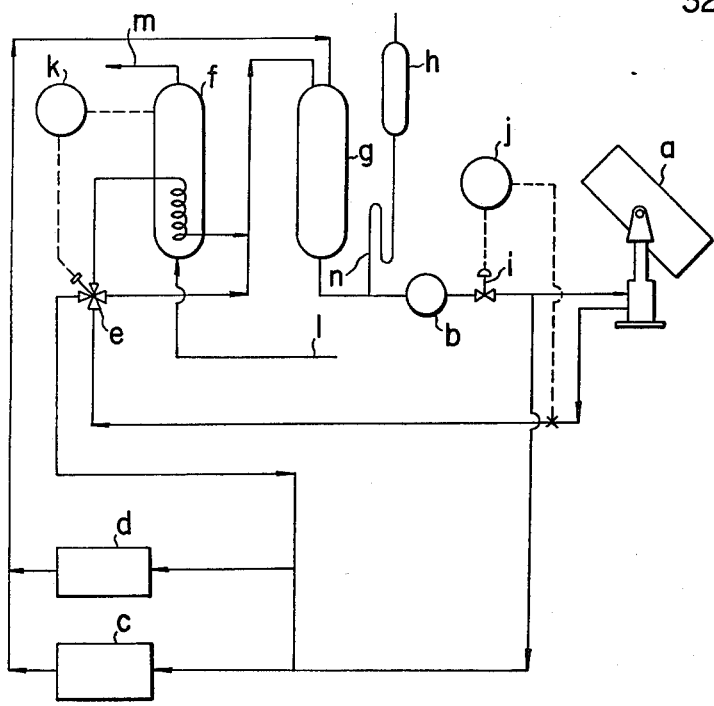

4,317,444

SOLAR HEAT UTILIZATION APPARATUS

BACKGROUND OF THE INVENTION

This invention relates to a solar heat utilization apparatus which is adapted to focus received sunrays and utilize the focused sunrays as heat energy for heating and cooling purposes.

In the utilization of solar heat as heat energy for the above-mentioned purposes, one of the most important points is that since available energy has a low density, such apparatus can be manufactured at less expense and the ratio of the radiation area of the heat collecting means to the heat receiving area of the reflector can be small. For this purpose, it is quite important to provide a device having a minimum area which is adapted to condense sunrays before the sunrays are converted into heat energy and then convert the condensed sunrays.

I have exerted my utmost efforts to develop a solar heat utilization apparatus which can satisfy the above-mentioned requirements and have reached the present invention which will be described hereinafter referring to the accompanying drawings.

SUMMARY OF THE INVENTION

The purpose of the present invention is to provide a solar heat utilization apparatus which can effectively satisfy the above-mentioned requirements called for such apparatus.

The sunray reflector employed in the solar heat utilization apparatus of the present invention substantially comprises a framework having a paraboloid shape which includes a plurality of warped plate members arranged in a parallel and spaced relationship to each other to provide a grid structure on which the paraboloid is formed; and a plurality of resilient metal plates which in combination form the mirror face of the reflector and are warped along and secured to the paraboloid of the grid structure.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

BRIEF DESCRIPTION OF THE DRAWINGS

FIG. 7 is a fragmentary view of the machanism for prevention of cold liquid discharge employed in said solar heat utilization apparatus of FIG. 4;

FIG. 8 is a sectional view showing the relationship between the double tube and fixed hollow shaft employed in said solar heat utilization apparatus of FIG. 4; and FIG. 9 is a schematic diagram showing the liquid flow circuit associated with said solar heat utilization apparatus of FIG. 4.

PREFERRED EMBODIMENT OF THE INVENTION

The present invention will be now described referring to the accompanying drawings in which one preferred embodiment of solar heat utilization apparatus of the present invention is shown for illustration purpose only, but not for limiting the scope of the present invention.

Figure 1:
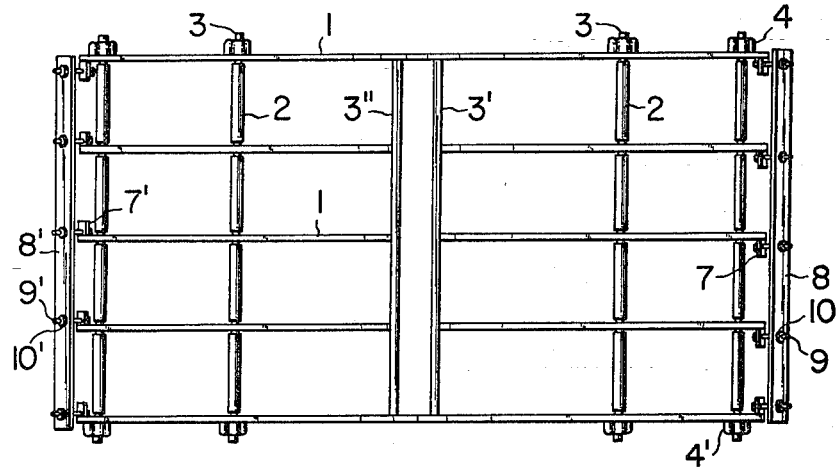
FIG. 1 is a top plan view of the framework of the sunray reflector employed in the solar heat utilization apparatus constructed in accordance with the present invention.
Figure 2:
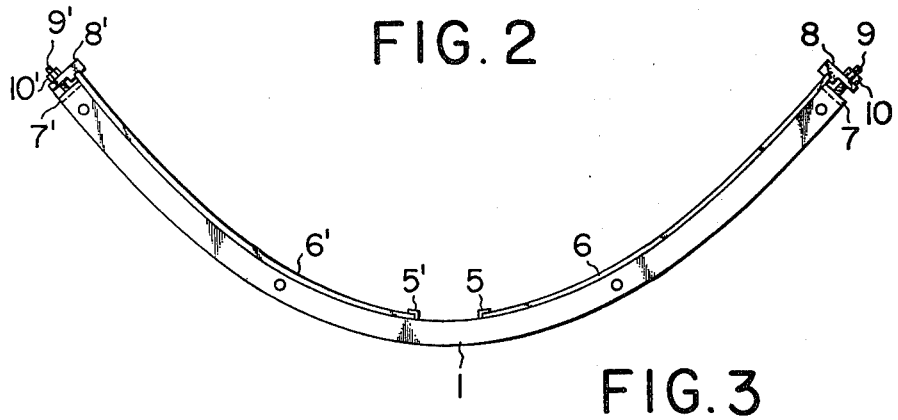
FIG. 2 is a side elevational view of said framework of the sunray reflector of FIG. 2.
Figure 3:
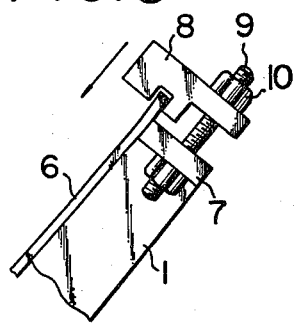
FIG. 3 is a fragmentary view on an enlarged scale of a portion of said framework of the sunray reflector of FIG. 2.

First referring to FIGS. 1 to 3 inclusive of the accompanying drawings, in these Figures, reference numeral 1 denotes a plate having a paraboloid shape and a plurality of such plates are arranged in parallel and spaced relationship to each other as shown in FIG. 1 to form a grid framework for a sunray reflector. Resilient metal plates of which description will be made hereinafter are warped along the paraboloid of the grid structure framework to form the mirror face of a reflector. The plates 1 having the paraboloids may be formed of metal, wood or plastic and obtained by cutting a stack of such plates to a desired length. The cut plates 1 are then arranged side by side in a parallel and spaced relationship to provide the grid structure framework. Hollow spacers 2 are provided between each two adjacent plates 1 in a plurality of parallel and spaced rows at right angles to the plates with the spacers 2 in each row coaxially aligned with each other and a bar 3 extends through aligned holes (not shown) in the plates 1 and the spacers 2 in each row. The opposite ends of each of the bars 3 are threaded and nuts 4, 4' are threaded on the threaded ends of the bars 3 to firmly hold the members in the grid structure framework in position.

As will be described hereinafter, a vertical rotary shaft is provided extending through the grid structure framework in the center thereof and thus, it is necessary that the resilient metal plates which form the mirror face be provided in the framework at an area thereof except for the area where the vertical rotary shaft extends through. For this purpose, in the formation of the grid structure framework, a pair of parallel and spaced bars 3', 3" are provided in the center of the framework where the vertical rotary shaft extends. Thus, in the illustrated embodiment, it is preferable that the intermediate plates 1 except for the two outermost plates 1 are cut away in the center portions so that the bars 3', 3" extend through the intermediate plates 1 between the outermost plates 1 and two metal plates 6 and 6' which form the mirror face are preferably arranged on the grid structure framework in an opposite and spaced relationship to each other leaving a clearance in the center of the framework where the vertical rotary shaft extends. If the metal plates 6 and 6' are arranged on the grid structure framework to cover the entire paraboloid thereof, the mirror face has to be cut circular or oval at the area where the vertical rotary shaft extends which may easily cause the mirror face to distort resulting in an undesirable reflective face or paraboloid curvature.

In the framework mentioned hereinabove, each of the plates 1 is provided with a pair of opposite and spaced hooks 5, 5' in the center portion thereof where the plates are connected to the bars 3',3". A pair of opposite and spaced metal plates 6, 6' are anchored at one or inner ends to the pair of hooks 5, 5', respectively and the other or outer ends of the metal plates are secured to the associated plate 1 by means of bolt and nut assemblies. A pair of supports 7, 7' are integrally formed with the opposite ends of each plate 1 and a pair of frame members 8,8' which have notches therein for receiving the extreme outer ends of the plates 6,6', respectively, are secured to the supports 7,7', respectively, by means of bolts 9,9' and nuts 10,10', respectively. Since the metal plates 6,6' are secured to the respectively associated plates 1 in the same manner, the securing of only one metal plate 6 will be described hereinbelow with the understanding that the description can be equally applied to the securing of the other metal plate 6'. First, the nut 10 is unscrewed to the degree that the frame member 8 is spaced from the support 7 by a distance sufficient to allow the frame member to receive the outer end of the metal plate 6 in the notch in the frame member and the nut 10 is then tightened to firmly secure the metal plate outer end to the plate 1 with no clearance left therebetween. Thereafter, if desired or necessary, the plate 1 and metal plate 6 are permanently secured together by means of spot welding or rivets to the degree that any distortion will not take place on the mirror face of the metal plate 6.

The metal plates 6, 6' which provide the mirror face are each preferably formed of a stainless steel plate the mirror face forming surface of which has been smoothened by buffing or by being a chrome plated steel plate.

A heat collecting means 11 is provided at the focus of the paraboloid of the sunray reflector. Such heat collecting means has been conventionally in the form of a pipe formed of metal or other suitable material, but the conventional pipe-type heat collecting means is subject to limitations with respect to both surface reflectivity and inner surface area or heat transfer area, and thus, the conventional heat collecting means cannot attain satisfactory heat collecting efficiency. Therefore, in the illustrated embodiment of the present invention, the heat collecting means employed in my liquid heating apparatus as disclosed in Japanese patent application publication No. 48702/1977 is preferably provided. Although the heat collecting means is not in detail shown in the accompanying drawings attached hereto, the heat collecting means comprises a double cylinder structure which includes an outer cylinder formed of transparent material such as glass and filled with liquid (usually, water) to provide lens effects and a coaxial inner cylinder provided within the outer cylinder at the area corresponding to the focus of the lens or outer cylinder and formed of black porous material such as porous graphite.

In the illustrated embodiment of the present invention, the heat collecting means 11 has a recycle pipe 12 connected and extending in parallel thereto and liquid to be heated flows from the recycle pipe 12 into the porous graphite inner cylinder of the heat collecting means 11 which has been heated through the absorption of sunrays and permeates through the inner cylinder to be heated thereby. The heated liquid then flows into the outer cylinder of the heat collecting means and exits the outer cylinder through the outlet of the cylinder to flow back into the recycle pipe 12. In this case, no problem is presented provided that the concentration ratio of sunrays is on the order of fifty times.

Since the area of the mirror face positioned below the heat collecting means 11 is intercepted by the heat collecting means, that particular area of the mirror face cannot reflect the sunrays. Thus, the recycle pipe 12 provided below the heat collecting means 11 provides a thermosyphon. If the thermosyphon is not provided, when the liquid flows through the heat collecting means in a one pass mode, unless the amount of sunrays to be absorbed by the heat collecting means, and the inlet temperature and amount of the liquid to be heated are adjusted from time to time, there are the difficulties of variation of the temperature of the liquid at the outlet of the outer cylinder of the heat collecting means 11, which is higher than that of the liquid at the inlet of the inner cylinder of the heat collecting means, the liquid temperature at the outlet may rise above the boiling point thereof to generate vapor, and/or the liquid is discharged from the outer cylinder at nearly as cold a temperature as at the time when the liquid flowed into the heat collecting means. The thermosyphon eliminates the above-mentioned difficulties and maintains a sufficient amount of liquid within the heat collecting means 11 and recycle pipe 12, mitigates the variation in temperature of the liquid and discharges the processed or heated liquid at a temperature as near as possible to the boiling point of the liquid.

The recycle pipe 12 is bulged outwardly in a mid-section between the opposite ends thereof and a mechanism for prevention of cold liquid discharge is provided within the bulged mid-section. As more clearly shown in FIG. 7, the mechanism comprises a partition plate or buffer 13 and a check valve 14. An inlet tube 15 and an outlet tube 16 for liquid to be heated are provided on the opposite sides of the pipe 12 in parallel to and in communication with the pipe 12. A liquid supply tube 17 is connected to the inlet tube 15 and a discharge tube 18 is connected to the outlet tube 16, respectively. The supply tube 17 and discharge tube 18 are connected to a common double tube 20 which is in turn coaxially disposed within a vertical rotary hollow shaft 19 for rotation together with the shaft.

Each of the plates 1 which constitute the framework of the sunray reflector is provided with a pair of opposite and spaced shaft support members 22, 22 in symmetry with respect to the center of the associated plate 1 for supporting one or inner ends of horizontal rotary shafts 21 with the other or outer ends of the horizontal shafts 21 rotatably supported in bearings 24 which are in turn suitably supported by the free ends of the opposite legs of a U-shaped frame member 23 secured to the vertical hollow rotary shaft 19. The horizontal rotary shafts 21 are disposed coaxial or substantially coaxial with the inlet tube 15 and outlet tube 16 for liquid to be heated.

The reason for which the horizontal rotary shafts 21 are disposed coaxial or substantially coaxial with the inlet tube 15 and outlet tube 16 is that when the shafts 21 are rotated so as to cause the reflector to trace the varying height of the sun as time goes by on a particular day, the rotation of the shafts 21 can be attained requiring a relatively low power. In order to impose the weight of the reflector on the fulcrums or horizontal shafts 21 substantially uniformly, the recycle pipe 12 is preferably disposed in a position just below and closely adjacent to the heat collecting means 11 in parallel to the latter. When the angle of the outer edge of the reflector with respect to the center thereof is greater than 215°, the recycle pipe 12 is disposed above and parallel to the heat collecting means 11 so as to support the weight of the reflector in a balanced condition.

The horizontal rotary shafts 21 are always maintained coaxial or substantially coaxial with the inlet tube 15 and outlet tube 16 as the deflector rotates because the reflector and accordingly, the recycle pipe 12 is adapted to move about the horizontal rotary shafts 21 so long as the relative position relationship between the horizontal rotary shafts 21 and recycle pipe 12 remains unchanged. And since the inlet tube 15 and outlet tube 16 are disposed on the opposite sides of the recycle pipe 12 in the same plane, if the above-mentioned cold liquid discharge prevention mechanism is not provided within the recycle pipe 12, there is the difficulty that the low temperature liquid to be heated flows from the inlet tube 15 directly to and through the outlet tube 16 bypassing the heat collecting means 11 and thus, the liquid at a low temperature discharges out of the system.

The reason why the common double tube 20 is connected to the supply tube 17 and discharge tube 18, which are in turn connected to the liquid inlet and outlet tubes 15, 16, respectively, and the double tube 20 is disposed coaxially with the vertical rotary shaft 19 is that in order to minimize the radiation area of the heat collecting means and connect the double tube 20 to a stationary shaft 25 positioned below the double tube as will be described hereinbelow, it is impossible to cause the double tube 20 to rotate freely if the tube 20 is not in the form of a double tube structure and not coaxial with the vertical rotary shaft 19.

As mentioned hereinabove, the double rotary tube 20 is connected to the hollow stationary shaft 25 positioned below the double tube and the stationary shaft is also in the form of a double tube structure which includes an outer tube 27 in communication with the outer tube 26 of the double tube 20 to provide a supply passage for liquid to be heated and a coaxial inner tube 29 in communication with the inner tube 28 of the double tube 20 to provide a discharge passage for the liquid after the heating thereof. In the illustrated embodiment, the sealing between the outer tubes 26, 27 of the double tubes 20, 25, respectively and between the inner tubes 28, 29 of the double tube and stationary shaft 20, 25 respectively, is not required to be closely tight, but may be just enough to prevent leakage of the liquid to the exterior of the system. In the illustrated embodiment, the sealing is effected by the employment of O-rings 30.

The outer tube 27 and inner tube 29 of the stationary shaft 25 are in communication with a liquid supply tube 31 and a liquid discharge tube 32, respectively. The liquid to be heated from the supply tube 31 of the stationary tube 25 passes through the supply passage defined between the outer tubes of the double tube-stationary shaft 20, 25 to and through the supply tube 17 of the recycle pipe 12 which is connected to the outer tube 26 of the double tube 20 to be heated within the recycle pipe. The heated liquid is discharged from the recycle pipe 12 through the discharge tube 18 into the inner tube 28 of the double tube 20 which is connected to the discharge tube 18 and then flows from the inner tube 28 through the discharge passage defined between the inner tube 28 of the double tube 20 and the inner tube 29 of the stationary shaft 25 to and through the discharge tube 32 of the stationary shaft 25 to be discharged out of the system.

Figure 4:
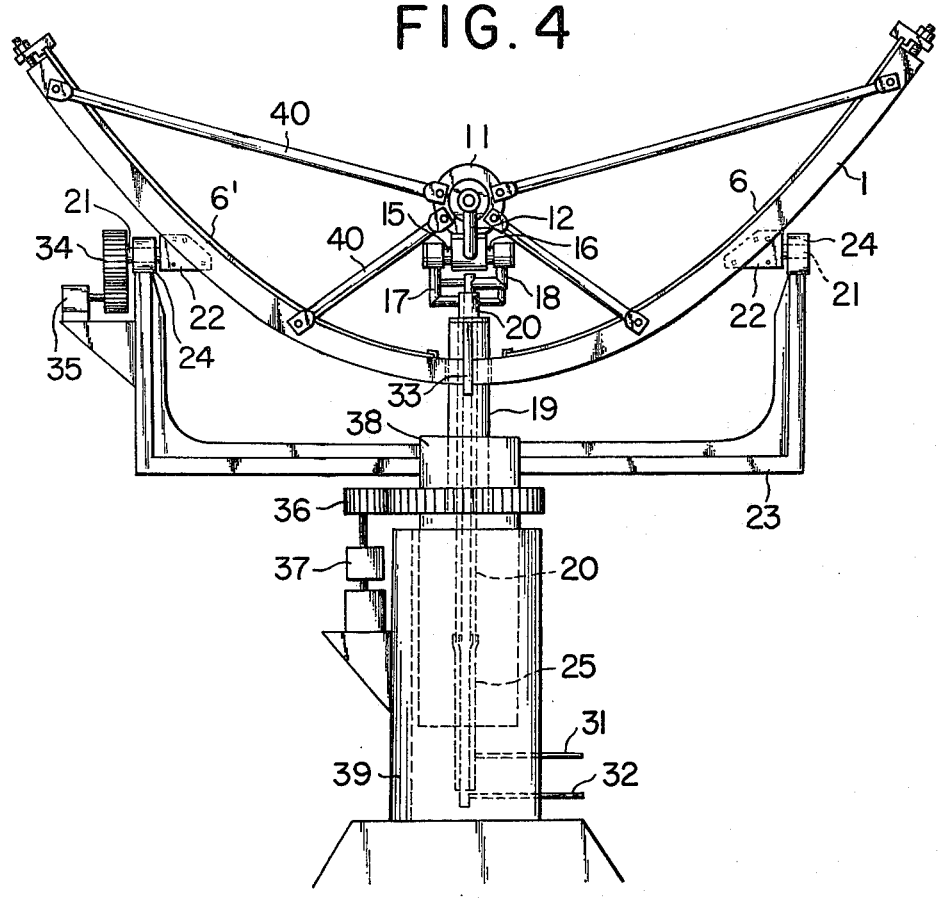
FIG. 4 is a side elevational view of said solar heat utilization apparatus.
Figure 5:
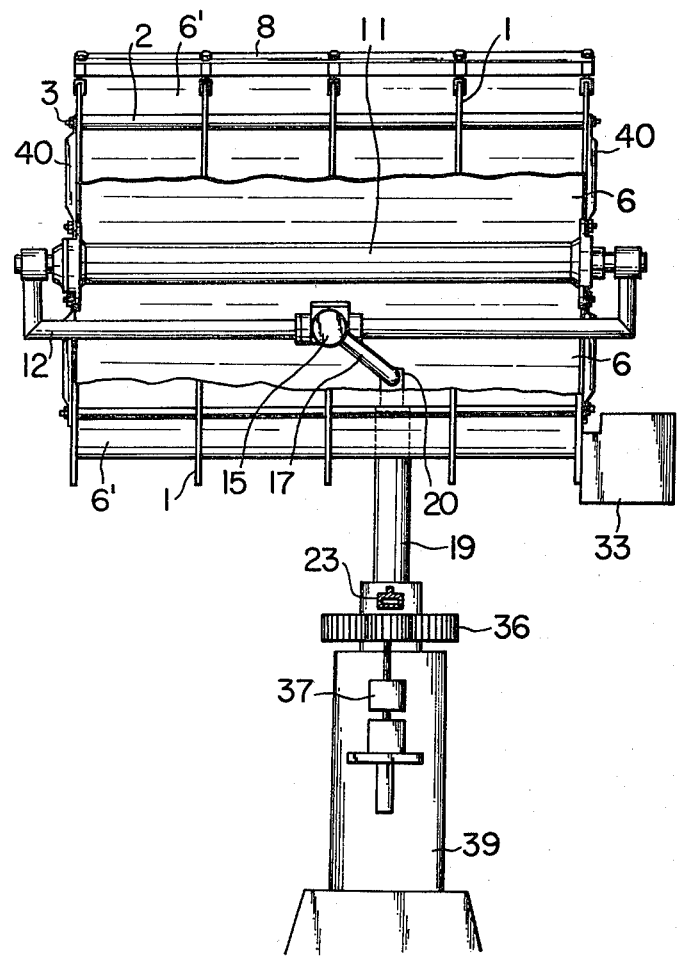
FIG. 5 is a front elevational view of said solar heat utilization apparatus of FIG. 4.
Figure 6:
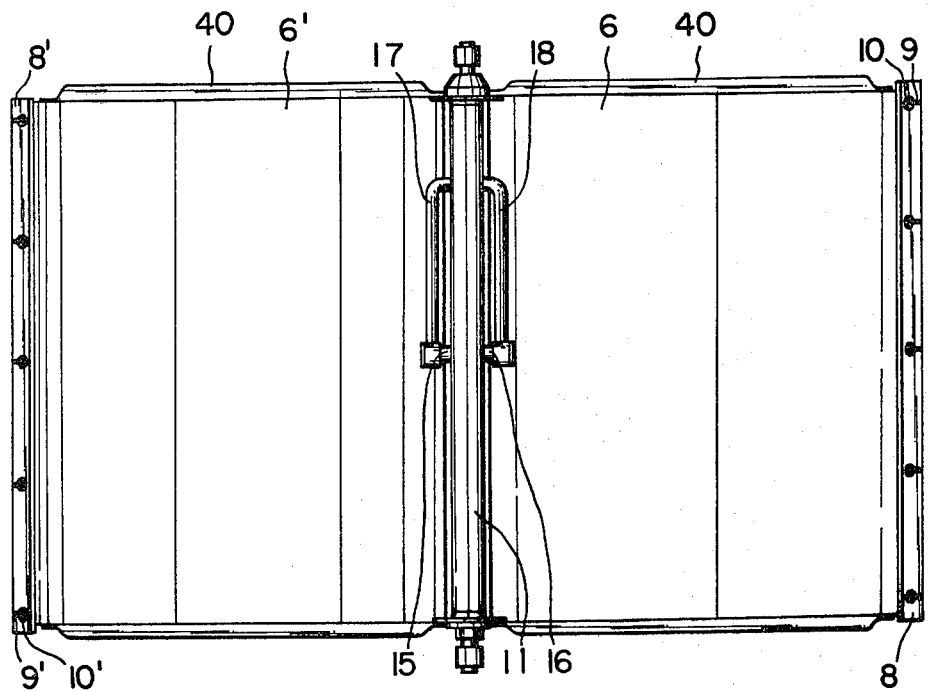
FIG. 6 is a top plan view of said solar heat utilization apparatus of FIG. 4.

In FIG. 4 of the accompanying drawings, reference numeral 33 denotes a rudder attached to one of the two outermost plates comprising the grid structure framework of the reflector, reference numeral 34 denotes a gear mounted at the outer end of one selected shaft of the horizontal rotary shafts 21, reference numeral 35 denotes a drive means such as a motor for driving the selected horizontal shaft and having the output shaft which carries at the inner end a gear meshing the gear 34, reference numeral 36 denotes a gear meshing a gear on the vertical rotary shaft 19 and mounted on the output shaft of a clutch type drive means 37 mounted on a pedestal 39 supporting the reflector assembly, reference numeral 38 denotes a pipe secured to the vertical rotary shaft 19 and reference numeral 40 denotes support rods for the reflector.

In the embodiment of solar heat utilization apparatus described hereinabove, the vertical rotary shaft 19 is designed to rotate at a rate depending upon the fixed revolving rate of the sun to trace the movement of the sun, but when the vertical rotary shaft 19 rotates tracing the revolving sun, if solid masses of cloud are present as in the case of a shower, the rotary shaft cannot trace the revolution of the sun and when the weather has improved after a heavy rain lasting for many hours, the rays from the sun may strike against the solar heat utilization apparatus from behind the reflector. Thus, since the angle of the sun tracer exceeds 180° which is the upper limit of the visual field designed for the tracer, an additional tracer is required to thereby make the solar heat utilization apparatus expensive. In order to overcome the difficulty, it has been recommended to use a time compensation device in combination with the solar heat utilization apparatus and the time compensation device is adapted to match the tracing timing and direction of the reflector with the revolution rate and direction of the sun by rotating the vertical rotary shaft at a fixed rate regardless of seasons. On the other hand, the possible maximum angle of elevation above the shafts 21 for the reflector to trace the sun is 90° and the tracing by the reflector is generally impossible at an angle of elevation less than 10° depending upon the installation site of the solar heat utilization apparatus and thus, generally, it is sufficient to rotate the reflector to the maximum angle of 80°. With the tracing angle range of the reflector described just above, the vertical rotary shaft has rotated to a position to position the reflector so as to face the sun at the sunrise on a day and thus, when the horizontal rotary shafts 21 are rotated in response to variation in the height of the sun, the solar heat utilization apparatus can utilize sunrays perfectly so long as the sun shines.

The solar heat utilization apparatus of the present invention is required to be protected against potential damage under high wind conditions, but it is in fact impossible to commercially manufacture the apparatus so as to withstand wind velocity up to 50 m/sec. because such apparatus becomes very expensive to thereby reduce the utility value of solar heat by the apparatus. In order to solve this problem, according to the present invention, the solar heat utilization apparatus is so designed that when the wind velocity reaches a predetermined value such as 15 m/sec. for example, the drive means for the horizontal rotary shafts operate automatically to rotate the horizontal shafts until the heat collecting means assumes the horizontal position, the clutch-type drive means 37 for the vertical rotary shaft is disengaged to rotate freely and the rudder 33 on the reflector minimizes the cross-section area of the reflector facing in the direction of wind.

A wind force detector resets the solar heat utilization apparatus to its operative condition when an air speedmeter associated with the detector indicates that there has been no wind force present for a predetermined time period such as 30 minutes, for example. In this case, since the reflector may be at any optional angle, a timing and angle compensation device is utilized and in order to rotate the reflector freely regardless of any direction of wind, it is preferable that the liquid supply and discharge passages are defined by the double tube as mentioned hereinabove. When the horizontal rotary shafts are driven by a motor, the motor can be advantageously provided with wiring which is adapted to be rotated frictionally by the vertical rotary shaft.

FIG. 9 is a schematic diagram of the liquid circulation circuit associated with the solar heat utilization apparatus according to the present invention. The liquid to be heated in the solar heat utilization apparatus is preferably one which is colorless and transparent, which is superior in heat-resistance and light-resistance, which has a low solidifying point and a high boiling point and which is non-toxic. One liquid satisfying such requirements is monopropyl haphthalene which has the solidifying point of $-50°$ C., the boiling point of 268° C. and the viscosity of 3 cp at 50° C. and 0.5 cp at 150° C. Such liquid also has the heating temperature range as high as 230°–240° C. In this case, when a regenerative tank having the capacity of 2 m$^3$ is employed, the heat quantity up to 100,000 Kcal can be obtained at the temperature range of 200° C. to 90° C. and thus, even on a day when no sunshine is available no auxiliary fuel is required. On the other hand, when water is employed as a liquid to be heated, the heat quantity to be obtained is only 10,000 Kcal at the temperature range from 95° C. to 90° C. and thus, any other auxiliary fuel is required to be supplemented.

When a warm drinking water is desired to be maintained at a raised temperature suitable for drinking for a long period of time, the warm water tends to emit an objectionable smell. Therefore, a warm drinking water is required to be placed in a vessel having a relatively small capacity so that the content of the vessel can be frequently and quickly replaced and as a result, a separate warm water tank has to be provided. The temperature within the regenerative tank generally fluctuates within the range of 200°–90° C. depending upon prevailing circumstances under which the heat quantity is utilized. Since the liquid can be heated to a high temperature and in the solar heat utilization apparatus, room cooling can be also advantageously performed when an absorption refrigeration system is employed. In case of room heating, since a liquid guide piping system extends through the floor of a room to be heated, the heat quantity required is about 70% of that required in the conventional warm air recycle system in which warm air is circulated through the room floor. And the quantity of liquid to be circulated is less than that required in the warm air recycle system and thus, the pipes employed in the floor piping may be of smaller diameter.

Referring to the schematic diagram of the liquid circulation circuit associated with the solar heat utilization apparatus of the present invention as shown in FIG. 9, the liquid is pumped from a regenerative tank g by a liquid feed pump b to the solar heat utilization apparatus a. In this case, in order to maintain the temperature within the liquid circulation circuit at a value within the range of 200°–220° C., the pumping amount or supply amount of the liquid is adjusted by actuating a temperature adjusting valve i by a temperature adjuster j. When warm water for drinking is consumed on a day when sunshine is not available, the temperature within a drinking water heating tank f drops and thus, a temperature adjusting meter k responds to such drop in the liquid temperature to actuate an automatic switching valve e so as to direct the liquid from the solar heat utilization apparatus a by the pump b through the automatic switching valve e, drinking water heating tank f into the regenerative tank g to thereby raise the temperature within the drinking water heating tank f. In this way, when the temperature within the drinking water heating tank f has been raised to a sufficient or predetermined value, the temperature adjusting meter k responds to such rise in the temperature to terminate the flow of the liquid by operating the switching valve. While the solar heat utilization apparatus is operating satisfactorily, also when the temperature within the drinking water heating tank f has risen to a predetermined value, the temperature adjusting meter k responds to such rise in the temperature whereby the flow of the liquid which normally passes through the automatic switching valve e and drinking water heating tank f to the regenerative tank g is changed into the flow of liquid which then passes from the automatic switching valve e to the regenerative tank g. When sunshine is sufficient and solar heat is available in a quantity in excess of a quantity required to be consumed in the drinking water heating tank f, as well as a cooling system c and a heating system d, the temperature within the regenerative tank g rises. As the temperature within the regenerative tank g reaches a predetermined value, the reflector of the solar heat utilization apparatus ceases to trace the sun. The light sensitive tracer which causes the solar heat utilization apparatus to trace the sun and to cease the tracing is not shown and described herein.

In the circuit, a liquid expansion tank h which functions as a relief is provided to accommodate variation in the volume of liquid in the system in response to variation in the temperature within the system. For this purpose, the temperature within the liquid expansion tank h is required to be maintained at a mode-rate value by providing a U-seal n. In FIG. 9, reference character l is a pipe at the inlet of a water service for drinking water and reference character m denotes a pipe at the outlet of warm water.

With the above-mentioned construction and arrangement of the components of the solar heat utilization apparatus of the present invention, sunrays can be effectively focused and practically utilized as heat energy.

While only one embodiment of the invention has been shown and described in detail, it will be understood that the same is for illustration purpose only and not to be taken as a definition of the invention, reference being had for this purpose to the appended claims.

What is claimed is:

1. In a solar heat utilization apparatus comprising a sunray reflector arcuately movable about an axis and a heat collecting means provided at the focus of said reflector, characterized by the fact that a liquid recycle pipe is provided along said heat collecting means and includes a cold liquid discharge preventing mechanism provided in a mid-section of said recycle pipe, and liquid inlet and outlet tubes attached to said cold liquid discharge prevention mechanism extending substantially coaxially with the reflector axis.

2. The solar heat utilization apparatus as set forth in claim 1, including a vertical rotary shaft in the form of a double tube which defines a liquid supply passage and a liquid discharge passage therein and said liquid supply passage is connected at the upper end to said inlet tube of said recycle pipe and said liquid discharge passage is connected at the upper end to said outlet tube of said recycle pipe.

3. The solar heat utilization apparatus as set forth in claim 2, wherein said sunray reflector comprises two reflective face sections spaced apart to define an area through which said vertical rotary shaft extends.

4. In a solar heat utilization apparatus comprising a sunray reflector mounted for rotation about a vertical rotary shaft extending in the center of said reflector and mounted for arcuate movement about a horizontal axis; and a heat collecting means provided at the focus of said reflector, characterized by the fact that a liquid recycle pipe is provided along said heat collecting means and includes a cold liquid discharge prevention mechanism provided in a mid-section of said liquid recycle pipe and liquid inlet and outlet tubes attached to said cold liquid discharge prevention mechanism extending substantially coaxial with the horizontal axis.

5. The solar heat utilization apparatus as set forth in claim 4, including a rudder to react with high wind velocities to rotate the reflector about the vertical shaft to minimize the effects of wind force on the reflector.

6. The solar heat utilization apparatus as set forth in claim 4, wherein the reflector is disposed in a non-symmetrical relationship to the axis of the vertical shaft to rotate the reflector about the vertical shaft to minimize the effects of wind force on the reflector.

7. The solar heat utilization apparatus as set forth in claim 4, including releasable drive means connected to drive the reflector about the axis of the vertical shaft, whereby when the wind force exceeds a predetermined magnitude the reflector is released to rotate about the vertical axis.

8. The solar heat utilization apparatus as set forth in claim 4, including drive means connected to rotate the reflector about the horizontal axis, whereby when a wind force exceeds a predetermined magnitude the reflector is rotated by said drive means to dispose the reflector in a horizontal orientation.

* * * * *

UNITED STATES PATENT AND TRADEMARK OFFICE
CERTIFICATE OF CORRECTION

PATENT NO. : 4,317,444
DATED : March 2, 1982
INVENTOR(S) : Saburo Maruko

It is certified that error appears in the above—identified patent and that said Letters Patent is hereby corrected as shown below:

Column 5, line 3 "deflector" should be --reflector--

Column 7, line 21, "haphthalene" should be --naphthalene--

Column 8, line 14 after "valve" insert --e--.

Column 8, line 41 "mode-rate" should be --moderate--

Signed and Sealed this

Twenty-fifth Day of May 1982

[SEAL]

Attest:

Attesting Officer

GERALD J. MOSSINGHOFF

Commissioner of Patents and Trademarks